US008775154B2

(12) United States Patent
Clinchant et al.

(10) Patent No.: US 8,775,154 B2
(45) Date of Patent: Jul. 8, 2014

(54) QUERY TRANSLATION THROUGH DICTIONARY ADAPTATION

(75) Inventors: Stephane Clinchant, Meylan (FR); Jean-Michel Renders, Quaix-en-Chartreuse (FR)

(73) Assignee: Xerox Corporation, Norwalk, CT (US)

( * ) Notice: Subject to any disclaimer, the term of this patent is extended or adjusted under 35 U.S.C. 154(b) by 1375 days.

(21) Appl. No.: 12/233,135

(22) Filed: Sep. 18, 2008

(65) Prior Publication Data

US 2010/0070521 A1    Mar. 18, 2010

(51) Int. Cl.
*G06F 17/30* (2006.01)
(52) U.S. Cl.
USPC .......... 704/2; 704/8; 704/9; 704/10; 707/706; 707/713; 707/999.003; 707/999.004; 707/999.005
(58) Field of Classification Search
USPC ............................................................ 704/9
See application file for complete search history.

(56) References Cited

PUBLICATIONS

Aitao Chen et al., "Multilingual Information Retrieval Using Machine Translation, Relevance Feedback and Decompounding", 2004, pp. 149-182.*
Djoerd Hiemstra et al., "Translation resources, merging strategies and relevance feedback for cross-language information retrieval", 2001, pp. 1-14.*
Tao Tao et al., "Regularized Estimation of Mixture Models for Robust Pseudo-Relevance Feedback", 2006, pp. 1-8.*
Monica Rogati et al., "Multilingual Information Retrieval Using Open, Transparent Resources in CLEF 2003", 2004, pp. 133-139.*
Hiemstra et al., "Translation resources, merging strategies and relevance feedback," In Carol Peters, editor, CLEF, vol. 2069 of Lecture Notes in Computer Science, pp. 102-115, Springer, 2000.
Monz et al., "Iterative Translation Disambiguation for Cross-Language Information Retrieval," Proceedings of the 28th annual international ACM SIGIR conference on Research and development in information retrieval, ACM Press, pp. 520-527, Aug. 15, 2005.
Liu et al., "A Maximum Coherence Model for Dictionary-based cross-language Information Retrieval," Proceedings of the 28th annual international ACM SIGIR conference on Research and development in information retrieval, NY, AACM Press, pp. 536-543, Aug. 15-19, 2005.
Kraaij et al.. "Embedding Web-Based Statistical Translation Models in cross-Language Information Retrieval," Computational Linguistics, 29(3), pp. 381-419, (2003).
Gao et al "Satstcal Quey Translation Modes or Coss-Language Information Retrieval" ACM Transactions on Asian Language Information Processing (TALIP), vol. 5, No. 4, pp. 323-359, Dec. 2006.
Rocchio, "Relevance Feedback in Information Retrieval," In The SMART Retrieval System: Experiments in Automatic Document Processing, pp. 313-323, Prentice Hall, 1971.
Qu et al., "Resolving Translation Ambiguity using Monolingual Corpora," Lecture Notes in Computer Science, Springer Berlin, vol. 2785, pp. 223-241, 2003.

* cited by examiner

*Primary Examiner* — Richemond Dorvil
*Assistant Examiner* — Mark Villena
(74) *Attorney, Agent, or Firm* — Fay Sharpe LLP

(57) ABSTRACT

Cross-lingual information retrieval is disclosed, comprising: translating a received query from a source natural language into a target natural language; performing a first information retrieval operation on a corpus of documents in the target natural language using the translated query to retrieve a set of pseudo-feedback documents in the target natural language; re-translating the received query from the source natural language into the target natural language using a translation model derived from the set of pseudo-feedback documents in the target natural language; and performing a second information retrieval operation on the corpus of documents in the target natural language using the re-translated query to retrieve an updated set of documents in the target natural language.

9 Claims, 2 Drawing Sheets

QUERY TRANSLATION THROUGH DICTIONARY ADAPTATION

BACKGROUND

The following relates to the information processing arts, information retrieval arts, cross-lingual natural language processing arts, and related arts.

Information retrieval systems provide a user-friendly interface by which a user can retrieve documents from a database that are relevant to or match a query. Typically, an information retrieval system ranks a "top N" documents that best match the query. An example of such a system is an Internet search engine.

In a simple approach, the information retrieval can operate by identifying documents of the database that contain the same words as those specified in the query. In this approach, the query "President Clinton" retrieves documents that include the terms "President" and "Clinton". However, this approach does not facilitate ranking; for example, if each of five different documents contain all words of the query, then there is no mechanism by which they can be relatively ranked. It may also fail if a relevant document contains most, but not all, terms of a query.

In more sophisticated approaches, a language model is generated to represent the distribution of vocabulary terms in a document. One language model is $P_{ML}(w|d)$ where w represents a vocabulary term, d represents the document being modeled, and $P_{ML}(w|d)$ represents the language model representing a statistical distribution or likelihood of term w in the document d computed using a maximum likelihood estimation. The language model is typically smoothed, for example $P(w|d)=\lambda \cdot P_{ML}(w|d)+(1-\lambda)P_{ML}(w|C)$ where $P_{ML}(w|C)$ is the maximum-likelihood language model for the corpus C representing a statistical distribution or likelihood of term w in the corpus C, $P(w|d)$ is the smoothed language model, and $\lambda$ controls the amount of smoothing. Such smoothing ensures a non-zero occurrence language model probability for vocabulary terms that do not occur in the document d.

A language model provides a better metric for ranking the documents respective to the query, and facilitates relatively ranking different documents. If the query is represented as a bag-of-words $q=\{q_1, \ldots, q_l\}$ where the terms $q_1, \ldots, q_l$ are the contents of the bag of words query q, then the probability that the query q would be generated by a document d can be estimated as $$P(q|d) = \prod_{i=1}^{l} P(q_i|d)$$

where $P(q_i|d)$ are the outputs of the language model of document d for query terms $q_i$.

A known extension is pseudo-relevance feedback. In this approach, a first retrieval operation is performed to obtain N most relevant documents, where N is an integer and N>0. A language model is derived for the N documents, and is used to update or enrich the original query. The idea is that the N most relevant documents are likely to be highly related to the subject matter of the query, and so similarities amongst the N most relevant documents provide information for enriching the query. In one approach, vocabulary terms that were not included in the original query but are highly probable in the language model of the top-N documents may be added to the original query to generate an improved query that is used in a second retrieval operation.

The foregoing relates to mono-lingual information retrieval, in which the query and the corpus of documents are both in the same language. Cross-lingual information retrieval systems extend this concept by retrieving documents from a corpus of documents in a target natural language based on a query formulated in a different source natural language. For example, the query may be formulated in English, but the corpus of documents may be in German.

Cross-lingual information retrieval facilitates retrieval of documents from a multi-lingual corpus (for example, containing documents in English, French, and German) using a single source-language query (for example, a query in English). As another application, cross-lingual information retrieval enables a person not fluent in the language of a mono-lingual corpus to formulate a query in his or her native language, and thus to retrieve the most relevant documents. The user can then obtain human and/or machine translations only of the retrieved most relevant documents.

Cross-lingual information retrieval can be performed by translating the query from the source language into the target language and performing the query on the documents in the target language using the translated query. That is, the query is moved into the target language domain and henceforth the retrieval system operates in the target language domain. This leverages the monolingual indexing and retrieval machinery of the corpus, and entails only constructing a "front end" to perform the query translation. However, cross-lingual information retrieval is dependent upon accurate translation of the query from the source language to the target language. This can be difficult due to the possibly short length of the query and generally known difficulties in automated translation between different natural languages.

Cross-lingual dictionaries are sometimes automatically generated as lexicons extracted from parallel corpora (that is, a corpus in which the same semantic textual content is represented in both the source and target languages). Such automatically generated dictionaries can contain errors due to misalignment of nominally parallel text, uncertainties in the extraction processes, and other errors introduced in the automated lexicon generation. They are also typically noisy, because they are automatically extracted from an aligned corpus. Noise can be introduced by mistakes in extraction algorithm (for example, the extraction of entries is computed with an alignment between words and reliance upon statistics). Noise can also be introduced when a dictionary is used in another domain. For example, if a dictionary is extracted from a news corpora and is then used for processing of a social sciences or humanities article, the vocabulary will likely be substantially different for these two different domains of data, and these differences may result in inappropriate word correlations. Another translation problem is polysemy, wherein a given source language term of the query may have different or multiple meanings calling for different translations in the target language. For example, the English term "bank" can mean either "financial institution" or "edge of a river". To properly translate "bank" into a language other than English one must know which meaning applies.

In the context of information retrieval, pseudo-relevance feedback is an attractive possibility for overcoming such translational difficulties, since the feedback documents provide potentially relevant contextual information. However, adapting pseudo-relevance feedback to cross-lingual information retrieval has heretofore been problematic. For example, one approach that has been attempted is to build language models of the target-language corpus documents in the source language, and to perform mono-lingual information retrieval including pseudo-relevance feedback using those source-language models. However, this approach is computationally intensive, and has been found to generate unacceptably noisy feedback.

It is generally more computationally efficient to translate the query into the target language and to perform the information retrieval in the target language domain. In that case, one might consider performing pseudo-relevance feedback entirely in the target language domain, after initial translation of the query. However, when the query includes polysemic terms, this approach will likely fail. The initial translation of the query into the target language generally includes all possible alternative target-language translations for the polysemic query term, since there is no basis for selecting between the alternative translations. All but one of those alternative target-language translations will generally be incorrect. Existing pseudo-relevance feedback techniques are not designed to remove incorrect terms, but rather to add additional terms so as to enrich the query. Hence, pseudo-relevance feedback performed entirely in the target language domain is not well-suited for addressing polysemic queries.

BRIEF DESCRIPTION

In some illustrative embodiments disclosed as illustrative examples herein, a method of performing cross-lingual information retrieval is disclosed, the method comprising: translating a query in a source natural language into a target natural language different from the source natural language to generate a starting query in the target natural language; performing a first information retrieval operation on a corpus of documents in the target natural language using the starting query in the target natural language to retrieve a set of pseudo-feedback documents in the target natural language; generating an updated query in the target natural language based on the set of pseudo-feedback documents in the target natural language; and performing a second information retrieval operation on the corpus of documents in the target natural language using the updated query in the target natural language to retrieve an updated set of documents in the target natural language.

In some illustrative embodiments disclosed as illustrative examples herein, a cross-lingual information retrieval system is disclosed, comprising a monolingual information retrieval system configured to retrieve documents from a corpus of documents in a target natural language based on a received query in the target natural language, and a processor configured to add cross-lingual information retrieval capability to the monolingual information retrieval system. The processor performs a process including: translating a query from a source natural language into the target natural language and inputting the translated query to the monolingual information retrieval system to retrieve a set of pseudo-feedback documents in the target natural language; generating a source language to target language translation model based on the set of pseudo-feedback documents; and re-translating the query from the source natural language into the target natural language using the translation model and inputting the re-translated query to the monolingual information retrieval system to retrieve an updated set of documents in the target natural language.

In some illustrative embodiments disclosed as illustrative examples herein, a storage medium is disclosed that stores instructions executable to perform a cross-lingual information retrieval method comprising: translating a received query from a source natural language into a target natural language; performing a first information retrieval operation on a corpus of documents in the target natural language using the translated query to retrieve a set of pseudo-feedback documents in the target natural language; re-translating the received query from the source natural language into the target natural language using a translation model derived from the set of pseudo-feedback documents in the target natural language; and performing a second information retrieval operation on the corpus of documents in the target natural language using the re-translated query to retrieve an updated set of documents in the target natural language.

DETAILED DESCRIPTION

Figure 1:
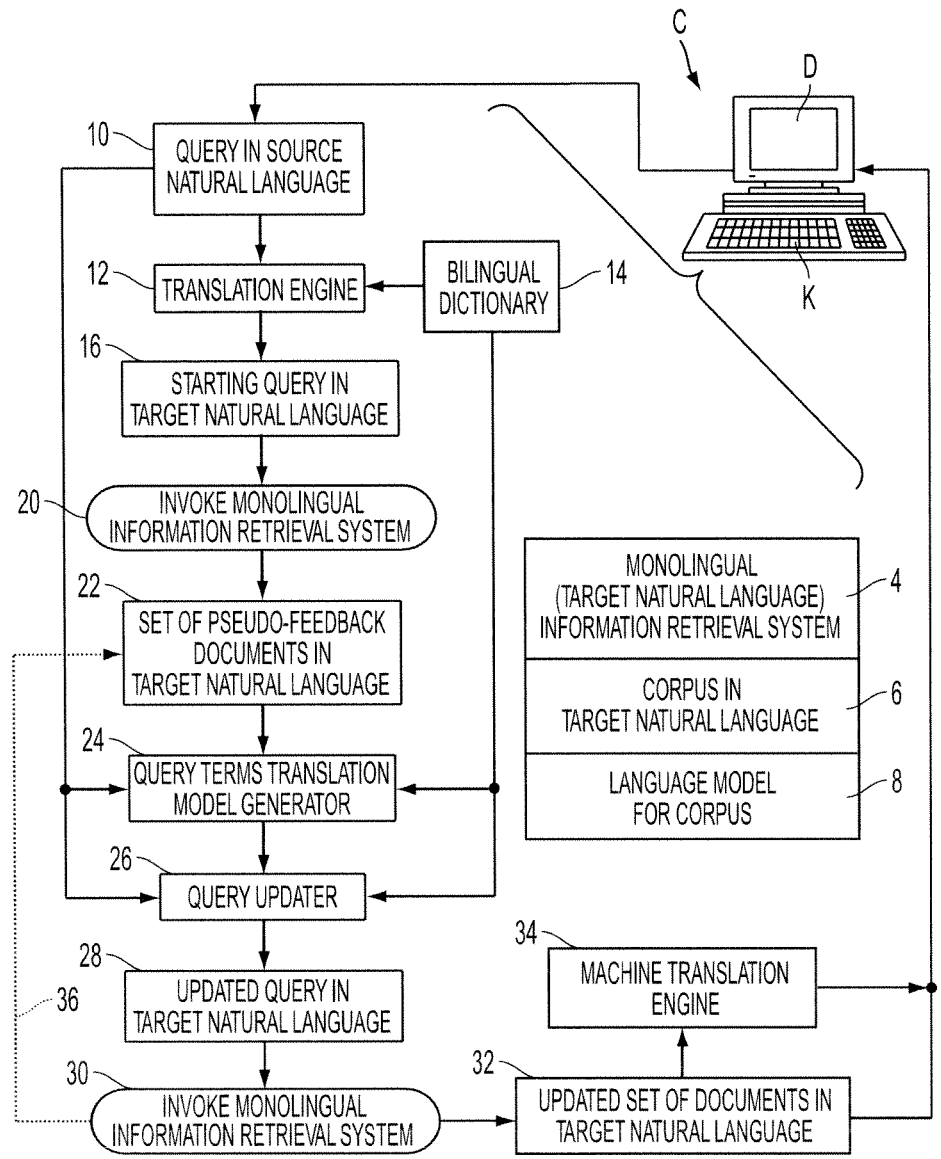
FIG. 1 diagrammatically shows a cross-lingual information retrieval system incorporating pseudo-relevance feedback to simultaneously enrich the query and to improve query translation accuracy.

With reference to FIG. 1, a cross-lingual information retrieval system is constructed based on a monolingual information retrieval system 4 that retrieves information from a monolingual corpus 6 containing documents in a target natural language. As used herein, the term "document" is intended to encompass any information collection or grouping that includes at least some text in a natural language, such documents including but not limited to: word processing documents or portions thereof; text-searchable PDF documents or portions thereof; XML documents or portions thereof; HTML documents or portions thereof; spreadsheet documents or portions thereof; presentation documents or portions thereof; electronic mail (email) messages; or so forth. The documents in the monolingual corpus 6 include text in the target natural language.

The monolingual corpus 6 may be a standalone corpus containing only documents in the target language. For example, if the target language is French, then the monolingual corpus 6 may comprise a standalone corpus containing only French-language documents. Alternatively, the monolingual corpus 6 may be a sub-set of a multi-lingual corpus. For example, the monolingual corpus 6 may include the French-language documents of a multi-lingual corpus including (for example) English-, French-, and German-language documents. Still further, it is contemplated for the monolingual corpus 6 to include documents containing text in the target language as well as in one or more additional natural languages. Thus, for example, the monolingual corpus 6 having French as the target natural language may include technical manuals having parallel sections written in English, French, and German.

The monolingual information retrieval system 4 is configured to receive a query in the target natural language and to retrieve documents from the monolingual corpus 6 in the target natural language based on the received query. In other words, the monolingual information retrieval system 4 operates in the target language domain on the corpus 6 which contains documents in the target language domain. The monolingual information retrieval system 4 can employ substantially any suitable monolingual information retrieval method. In one suitable approach, each document of the corpus 6 is represented by a language model $\theta_{dw}$ of the form $\theta_{dw}=P(w|d)=\lambda \cdot P_{ML}(w|d)+(1-\lambda)P_{ML}(w|C)$, where w represents a target language vocabulary term, d represents the document (in the target language) being modeled, $P_{ML}(w|d)$ is an unsmoothed language model representing a statistical distribution or likelihood of term w in the document d computed using a maximum likelihood estimation, C denotes the target language corpus 6, $P_{ML}(w|C)$ denotes a corpus language model 8 indicative of a statistical distribution or likelihood of term w in the corpus C computed by maximum likelihood estimation, P(w|d) is the smoothed language model, and λ controls the amount of smoothing. It is contemplated to omit the smoothing, which is equivalent to setting the parameter λ=1 in which case the corpus language model $P_{ML}(w|C)$ 8 is not needed. Moreover, other formalisms, approximations, or representations are contemplated for computing the language model $\theta_{dw}$.

Given the language models $\theta_{dw}$ for the documents of the corpus 6, the documents can be ranked according to a suitable measure of similarity between a document and the query in the target natural language. In general, this similarity measure can be represented as $P(q|\theta_d)$ where q denotes the query in the target natural language and $\theta_d$ denotes the language model for a given document d, where the language model $\theta_d$ is a vector having terms $\theta_{dw}$ with a number of dimensions or vector elements equal to the size of a target language vocabulary (that is, spanning over all vocabulary words w). If the query q is represented as a bag-of-words according to $q=\{q_1, \ldots, q_l\}$ where $q_1, \ldots, q_l$ are the words of the bag-of-words, then one suitable ranking value for a document d is given by $$P(q|d) = \prod_{i=1}^{l} P(q_i|\theta_d).$$

In some embodiments, the query q is represented by a query language model $\theta_q$ which is a vector of length equal to the number of target language vocabulary terms whose elements are $\theta_{qw}=P(w|q)$. The elements P(w|q) may be set to $P(w|q)=1 \forall w \in \{q_1, \ldots, q_l\}$ and to P(w|q)=0 otherwise. For the query q represented by a query language model $\theta_q$, one suitable ranking value for a document d is given by a cross-entropy measure between the query language model $\theta_q$ and the document language model $\theta_d$, that is, $$CE(\theta_q|\theta_d) = \sum_w \theta_{qw} \log(\theta_{dw}).$$

Other ranking measures, such as a KL-divergence-based ranking measure, are also contemplated.

The above embodiments of the monolingual information retrieval system 4 are merely illustrative. In general, the monolingual information retrieval system 4 can be any system configured to (i) receive as input a query in the target natural language and to (ii) output a set of documents retrieved from the corpus 6 that are relevant to the received query.

The cross-lingual information retrieval system of FIG. 1 utilizes the monolingual information retrieval system 4 to perform cross-lingual information retrieval, and further incorporates pseudo-relevance feedback to simultaneously enrich the query and to improve query translation accuracy. A query 10 is received in a source natural language that is different from the target natural language of the monolingual information retrieval system 4. To use the monolingual information retrieval system 4 to perform cross-lingual information retrieval, a translation engine 12 translates the query 10 into the target natural language. The translation engine 12 makes use of a bilingual dictionary 14. As used herein, the bilingual dictionary 14 is a data compilation capable of receiving as input a vocabulary term in the source natural language and outputting one or more potential translations which are vocabulary terms in the target natural language that are potential translations for the input source natural language vocabulary term. The bilingual dictionary 14 optionally may also be operative in the reverse direction, that is, may be capable of receiving as input a vocabulary word in the target language and outputting one or more words in the source language as possible translations.

The output of the translation engine 12 is a starting query 16 in the target natural language. The starting query 16 may have certain deficiencies. For example, if an input source natural language vocabulary term of the source-language query 10 is polysemic, then the bilingual dictionary 14 will output two or more potential translations, both (or all) of which will be included in the starting query 16. Moreover, any deficiencies of the source-language query 10, such as failure to include certain terms that may be relevant to the subject matter of the query, will carry through the translation into the translated starting query 16.

In a first retrieval operation 20, the monolingual information retrieval system 4 is invoked to retrieve from the corpus 6 a set of ranked documents relevant to the translated starting query 16. In view of the recognized possible deficiencies of the translated starting query 16, the output of the first retrieval operation 20 is treated as a set of pseudo-feedback documents 22 in the target natural language, and are used to improve upon the translated starting query 16.

In the embodiment of FIG. 1, the improvement is performed as follows. A query terms translation model generator 24 receives the set of pseudo-feedback documents 22, and uses contextual information provided by the set of pseudo-feedback documents 22 to generate an improved translation model for translating the query terms of the source-language query 10 into the target natural language. As an intuitive example, if one of the query terms is polysemic, then the relative frequencies of the alternative translations of the polysemic term in the set of pseudo-feedback documents 22 can be measured and this information can be used to bias the translation of the polysemic term toward the more frequently occurring alternative translation or translations.

Moreover, the improved translation model optionally biases or weights the translations of different source language query terms relative to one another to reflect their frequency of occurrence in the set of pseudo-feedback documents 22. For example, if a first source query word $w_{s1}$ translates to target query word $w_{d1}$, and a second source query word $w_{s2}$ translates to target query word $w_{d2}$, and the frequency of $w_{d1}$ in the set of pseudo-feedback documents 22 is substantially higher than the frequency of $w_{d2}$, then this can be reflected by assigning a higher translation probability to the $(w_{s1}, w_{d1})$ translation pair as compared with the $(w_{s2}, w_{d2})$ translation pair.

Based on the generated improved query terms translation model, a query updater 26 re-translates the source-language query 10 to generate an updated query 28 in the target natural language. In a second retrieval operation 30, the monolingual information retrieval system 4 is invoked a second time to retrieve from the corpus 6 an updated set of ranked documents 32 in the target natural language, which this time are relevant to the re-translated query 28.

The updated or re-translated query 28 is expected to be substantially improved over the starting translated query 16. For example, polysemic source query terms are generally more accurately represented in the updated or re-translated query 28 as compared with in the starting translated query 16. Similarly, the updated or re-translated query 28 optionally weights the translations of different source query terms based on their frequency of occurrence in the set of pseudo-feedback documents 22, which again is generally expected to enhance the representativeness of the updated or re-translated query 28 respective to the subject matter of the originally received source-language query 10.

Accordingly, in some embodiments the updated set of ranked documents 32 in the target natural language is taken as the final output set of documents, and is utilized in a suitable fashion. For example, the updated set of ranked documents 32 may be displayed on a display D of a computer C or otherwise output in a human-perceptible format. Alternatively, the updated set of ranked documents 32 in the target natural language may first be translated to the source natural language by a machine translation engine 34 (which in some embodiments is identical with the translation engine 12), and the translated documents may be displayed on a display D of a computer C or otherwise output in a human-perceptible format. This latter approach is particularly suitable when the user is likely to be fluent in the source natural language but not in the target natural language.

In some embodiments, it is contemplated to repeat the pseudo-feedback process one or more additional times to further improve the query. In such embodiments, as shown diagrammatically in FIG. 1 by an iteration flow loop 36, the updated set of ranked documents 32 is treated as an updated set of pseudo-feedback documents 22, and are processed by the query terms translation model generator 24 and the query updater 26 to generate a further updated query in the target natural language that is used in a third invocation of the monolingual information retrieval system 4 to generate a further updated set of documents. This iterative processing is optionally performed one or more times to iteratively refine the query and the set of retrieved documents.

The various system components of FIG. 1 can be variously arranged. In some embodiments, the monolingual information retrieval system 4 is a standalone component, and a processor (such as the processor of the illustrated computer C) is configured to add cross-lingual information retrieval capability to the monolingual information retrieval system 4 by implementing the additional components 12, 24, 26 and including suitable hooks or links to the monolingual information retrieval system 4 to implement the retrieval operations 20, 30. In some such embodiments, the same processor may implement both the monolingual information retrieval system 4 and the additional components 12, 24, 26. In other such embodiments, one processor may implement the monolingual information retrieval system 4 while another, different processor may implement the additional components 12, 24, 26. In this last case, the two different processors may be located remote from one another—for example the monolingual information retrieval system 4 could be an Internet search engine server which the processor implementing the additional components 12, 24, 26 accesses via the Internet. More generally, the various processing components 4, 12, 24, 26 may be embodied as any suitable processing device, such as the illustrated computer C, or as a network server, or as a personal data assistant (PDA), or so forth. The query 10 may be received via various mechanisms, such as an illustrated keyboard K, a mouse, trackball, or other user input device, or the query may be received from an automated source such as an automated data mining system. The various processing components 4, 12, 24, 26 may also be embodied as a storage medium storing instructions executable to perform the processing. Suitable storage media include, for example: magnetic tape; a magnetic disk or disks; an optical disk; random access memory (RAM); read-only memory (ROM); FLASH or other electrostatic memory; or so forth.

Having provided an overview of the cross-lingual information retrieval system of FIG. 1, some illustrative embodiments of the query terms translation model generator 24 and query updater 26 are next presented.

Figure 2:
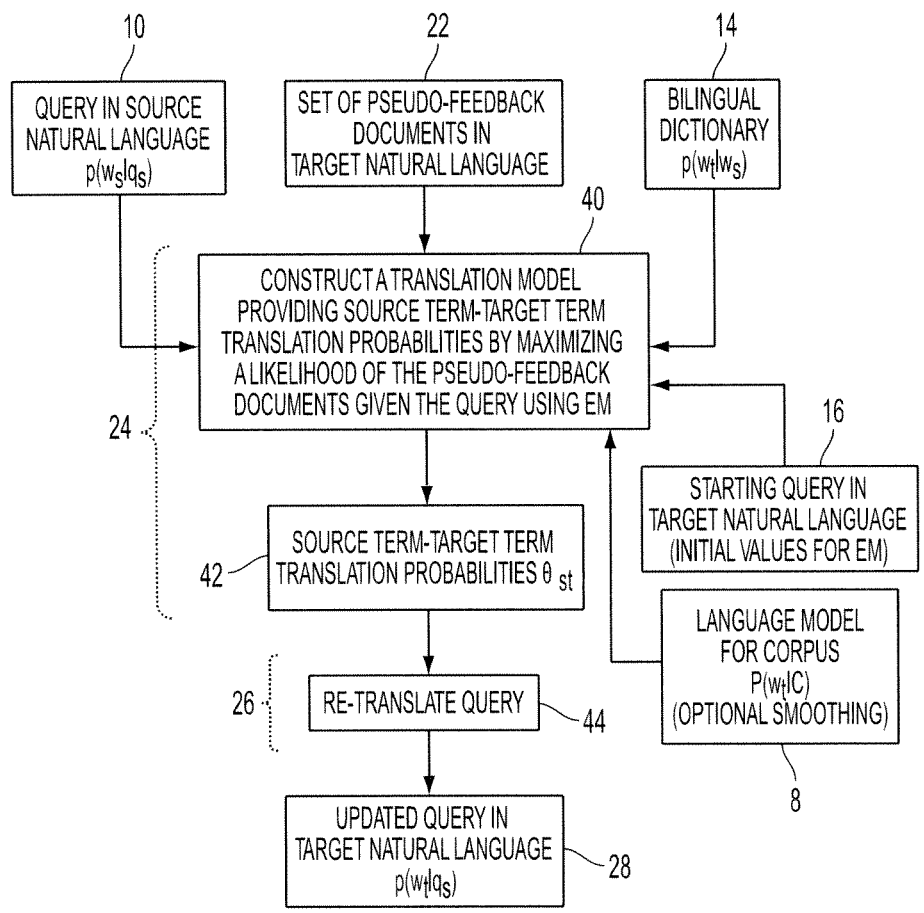

With reference to FIG. 2, the query terms translation model generator 24 receives the source language query 10 and the set of pseudo-feedback documents 22. The query terms translation model generator 24 optionally receives further relevant information, such as an indication of the alternative target language translations for the various source-language query terms as provided by the bilingual dictionary 14.

In the illustrative example of FIG. 2, the query in the source language is suitably represented as $q_s = \{w_{s1}, \ldots, w_{sl}\}$. This can also be represented as a probabilistic query language model according to $p(w_s|q_s)$, for example as $p(w_s|q_s)=1$, $w_s \in \{w_{s1}, \ldots, w_{sl}\}$ and $p(w_s|q_s)=0$, otherwise, or as a smoothed version smoothed by the corpus language model 8, or so forth. If the query $q_s=\{w_{s1}, \ldots, w_{sl}\}$ includes some duplicate words, then $p(w_s|q_s)$ may also have values intermediate between 0 and 1, such that $p(w_s|q_s)$ represents the frequency of occurrence of $w_s$ in the query q, using a maximum likelihood estimate or another suitable estimation.

In the translation process, the objective is to identify $P(w_t|q_s)$, which is the probability of a target term $w_t$ given the source query $q_s$. This can be written as $P(w_t|w_s, q)$, which is the probability that the query term $w_s$ in the source language translates to the target language term $w_t$, given the context of the query q. Computing this probability entails defining or approximating the context of a query, or its associated "concept". In the cross-lingual information retrieval techniques disclosed herein, the context of the query as it is initially given in the source language can be extracted from the set of pseudo-feedback documents 22. In other words, the coherence is implicitly present in the set of pseudo-feedback documents 22.

The approach of FIG. 2 employs a language model that is analogous to the monolingual language model $\theta_{dw}$ for a document, which is of the form $\theta_{dw}=P(w|d)=\lambda \cdot P_{ML}(w|d)+(1-\lambda)P_{ML}(w|C)$ as already discussed. Indexing the set of pseudo-feedback documents 22 as $d_i$ where $i=1, \ldots, n$, the document $d_i$ can be represented as a bag-of-words according to $d_i \sim \text{Multinomial}(1_{d_i}, \lambda \Sigma_{w_s} \theta_s p(w_s|q_s)+(1-\lambda)p(\cdot|C))$ where $1_{d_i}$ is the length of the document $d_i$. In this framework, $\theta_s$ can be interpreted as an adapted probability of translation, having vector elements $\theta_{st}=p(w_t|w_s,q_s)$. The parameter $\theta_s$ can also be interpreted as a probability distribution (multinomial parameter) over the vocabulary of target terms $\{w_t\}$. In other words, the parameter $\theta_s$ is like a language model, but associated to a specific word $w_s$ of the initial source-language query $q_s$.

Analogizing to the monolingual model, one can write $\theta_F = \Sigma_{w_s} \theta_s p(w_s|q_s)$. Note that the same algorithm output $\theta_{st}=p(w_t|w_s,q_s)$ realizes both query enrichment and dictionary adaptation (that is, improved translation specific to the query $q_s$). Note also that the translation/adaptation is limited to the words of the query $q_s$, that is, limited to the set $\{w_s\}$, if the query $q_s$ is represented a maximum likelihood language model of the form $p(w_s|q_s)$, which is assumed for the illustrative example of FIG. 2. Further, the role of the bilingual dictionary 14 is seen as providing reasonable starting values for the translation probabilities $\theta_{st}=p(w_t|w_s,q_s)$. In the following, an expectation-maximization (EM) algorithm is used to improve the translation probabilities $\theta_{st}=p(w_t|w_s,q_s)$ based on feedback provided by the set of pseudo-feedback documents 22. In other words, it is desired to estimate the parameters of the vectors $(\theta_s)_{w_s \in q}$ where q is the initial query 10.

The parameters $(\theta_s)_{w_s \in q}$ are suitably estimated using a maximum likelihood approach using an EM-like algorithm in an operation 40 shown in FIG. 2 that is performed by the query terms translation model generator 24. The parameter $\lambda$ which dictates the amount of smoothing is taken to be a known fixed parameter. The source-language query language model $p(w_s|q_s)$ is also known since it represents the distribution of words $w_s$ in the query $q_s$ 10 which is received in the source natural language. Representing the set of pseudo-feedback documents 22 by the symbol F, the translation probabilities $\theta_{st} = p(w_t|w_s,q_s)$ can be estimated by maximizing the likelihood of the known set F given the translation probabilities vectors $\theta = \{(\theta_s)_{w_s \in q}\}$. In mathematical form, it is desired to maximize the likelihood $P(F|\theta)$ given by:

$$P(F|\theta) = \prod_k \prod_{w_t} \left( \frac{\lambda \left( \sum_{w_s} \theta_{st} p(w_s|q_s) \right) + }{(1-\lambda) P(w_t|C)} \right)^{c(w_t|d_k)}, \quad (1)$$

where k indexes the pseudo-feedback documents $d_k$ and $c(w_t|d_k)$ is the number of (that is, count of) occurrences of the target-language term $w_t$ in the document $d_k$.

A suitable approach for maximizing the likelihood of Equation (1) respective to the term $\theta = \{(\theta_s)_{w_s \in q}\}$ using the EM algorithm is as follows. Let $t_{wd}$ represent the hidden random variable whose value is 1 if word $w_t$ in document $d_k$ has been generated by $P(\cdot|C)$, and 0 otherwise. (In the following, the subscript t is omitted to simplify the notation where the context makes clear that the expressions are in the target natural language domain, for example writing $t_{wd}$ instead of $t_{w_t d_k}$). Similarly, let $r_{ws}$ be the indicator variable for which query word $w_s$ has been chosen (having value 1 if $w_s$ is chosen, 0 otherwise; again, the subscript s is omitted for notational simplicity). Let $\theta_{ts} = p(w_t|w_s,q_s)$ be the unknown parameter of this model. Then the "E" step of the EM algorithm yields:

$$p(t_{wd} = 1|F, \theta^{(i)}) = \frac{(1-\lambda)p(w_t|C)}{\lambda \left( \sum_{w_s} \theta_{ts}^{(i)} p(w_s|q_s) \right) + (1-\lambda)P(w_t|C)} \quad (2)$$

and $$p(t_{wd} = 0|F, \theta^{(i)}) = 1 - p(t_{wd} = 1|F, \theta^{(i)}), \quad (3)$$

where the index i denotes the current iteration of the EM algorithm. Then, as $r_{ws}$ is defined only for $t_{wd}=0$ it follows that:

$$p(r_{ws}=1|F,\theta^{(i)},t_{wd}=0) \propto p(w_s|q_s)\theta_{ts}^{(i)} \quad (4)$$

In the "M" step of the EM algorithm, it is desired to optimize a lower bound of the expected log-likelihood according to:

$$Q(\theta^{(i+1)}, \theta^{(i)}) = \sum_{k,w_t} c(w, d_k) \left( \begin{array}{l} p(t_{wd}=1|\theta^{(i)}) \log \left( \begin{array}{l} (1-\lambda)p(w_t|C) + \\ p(t_{wd}=0|\theta^{(i)}) \end{array} \right) \\ \sum_{w_s} p(r_{ws}=1|\theta^{(i)}) \log(p(w_s|q_s)\theta_{ts}^{(i+1)}) \end{array} \right). \quad (5)$$

Differentiating with respect to $\theta^{(i+1)}$ and adding Lagrange multiplier (for $\sum_{w_t} \theta_{ts} = 1$) gives the "M"-step:

$$\theta_{ts}^{(i+1)} \propto \sum_k c(w_t, d_k) p(t_{wd} = 0|F, \theta^{(i)}) p\left( \begin{array}{l} r_{ws} = 1|F, \theta^{(i)}, \\ t_{wd} = 0 \end{array} \right). \quad (6)$$

As already mentioned, $\theta^{(0)}$ is given by the corresponding part of an initial (probabilistic) non-adapted dictionary, that is, the starting query in the natural language 16. The output of the iterative EM estimation is a set of adjusted source word-to-target word translation parameters $\theta_{st} = p(w_t|w_s,q_s)$ 42 that are adjusted based on the contextual information provided by the set of pseudo-feedback documents 22.

In the disclosed likelihood maximization and the illustrative EM algorithm, the term "maximize" and similar terms is intended to be broadly construed to encompass not only absolute maximization respective to a global maximum value, but also approximate maximization or maximization respective to a local maximum. For example, an iterative process such as expectation maximization (EM) may be used to maximize a likelihood. In doing so, the EM algorithm may be terminated based on stopping criteria that causes the EM algorithm to stop the maximization at a point where the likelihood is not yet at the absolute global maximum. Such maximization is said to maximize the likelihood, even though the final likelihood may not be the absolute largest likelihood attainable. Similarly, the EM algorithm may converge to a local maximum rather than to the global maximum. Again, such maximization is said to maximize the likelihood, even though the final likelihood may not be the absolute largest likelihood attainable.

The illustrative embodiment of FIG. 2 generates the adjusted source word-to-target word translation parameters $\theta_{st} = p(w_t|w_s,q_s)$ 42 by maximizing the likelihood of Equation (1) using the EM algorithm described with reference to Equations (2)-(6). However, other techniques can be employed to maximize the likelihood of Equation (1). Furthermore, other likelihood formulations can be employed instead of the illustrative likelihood $P(F|\theta)$ given in Equation (1). Still further, other approaches besides likelihood maximization can be used to adjust the source word-to-target word translation parameters $\theta_{st} = p(w_t|w_s,q_s)$ to provide improved conformance with the contextual information provided by the set of pseudo-feedback documents 22.

With continuing reference to FIGS. 1 and 2, the adjusted source word-to-target word translation parameters $\theta_{st} = p(w_t|w_s,q_s)$ 42 are used by the query updater 26 to update the query in the target natural language. In the illustrative embodiment of FIG. 2, the query updater 26 performs a query re-translation operation 44, using the adjusted translation parameters 42, to generate the updated query 28 in the target natural language. In one approach, the new query 28 is generated by using all entries in the adapted dictionary represented by the set of adjusted translation parameters $\theta = \{(\theta_s)_{w_s \in q}\}$ 42. In this approach, no translation term selection or thresholding is employed to compute the updated query 28. Rather, the probabilistic nature of the employed language model inherently biases toward those translation terms best matching the context provided by the set of pseudo-feedback documents 22. Additionally, that same probabilistic nature ensures that the various query terms in the re-translated query are relatively weighted to emphasize terms that occur most frequently in the context provided by the set of pseudo-feedback documents 22. In effect, the re-translation makes use of an adjusted dictionary learnt by the feedback processing 40. The adjusted query is suitably represented by a language model $p(w_t|q_s)$ generated by, for each alternative translation term $w_t$, summing over the source-language query terms $w_s$ the probability $\theta_{st} = p(w_t|w_s, q_s)$ that the term $w_t$ is a correct translation (in the context of query $q_s$) of the source word term $w_s$. Mathematically, this can be written as:

$$p(w_t | q_s) = \sum_{w_s} \theta_{st}^{adapted} P(w_s | q_s), \qquad (7)$$

where the notation $\theta_{st}^{adapted}$ emphasizes that the translation probability terms $\theta_{st}^{adapted} = p(w_t|w_s, q_s)$ are probabilities obtained by maximizing the illustrative likelihood $P(F|\theta)$ given in Equation (1). The output of the re-translation 44 performed (in the illustrative embodiment) in accordance with Equation (7) is the updated query $p(w_t|q_s)$ 28 in the target natural language.

The starting query 16 translated using the dictionary 14 is used as the starting point for the EM algorithm. Operation of the EM algorithm ensures that any parameter value that starts at zero will remain at zero. In other words, the EM algorithm cannot cause a parameter initially having a value of zero to change to a value other than zero. As a consequence, only non-zero entries are affected by the EM processing. It follows that no new source word-to-translation word pairs are created by the EM algorithm. During the iterations of the EM algorithm, the (non-zero) dictionary weights are adapted to fit the feedback documents 22 and hence to choose an improved translation of the received query 10.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of performing cross-lingual information retrieval, the method comprising:
   translating a query $q_s = \{w_{s1}, \ldots, w_{sl}\}$ in a source natural language represented as a starting query language model $P(w_s|q_s)$ in the source natural language into a target natural language different from the source natural language to generate a starting query in the target natural language, wherein $P(w_s|q_s) = 0$ for words $w_s$ that are not in the query $q_s = \{w_{s1}, \ldots, w_{sl}\}$;
   performing a first information retrieval operation on a corpus of documents in the target natural language by inputting the starting query in the target natural language to a monolingual information retrieval system configured to operate in the target natural language in order to retrieve a set of pseudo-feedback documents in the target natural language;
   generating an updated query in the target natural language represented as an updated query language model $p(w_t|q_s)$ in the target natural language computed as:

$$p(w_t | q_s) = \sum_{w_s} \theta_{st}^{adapted} P(w_s | q_s)$$

where $\theta_{st}^{adapted}$ represents a translation model generated by maximizing a likelihood of the set of pseudo-feedback documents in the target natural language given the starting query language model $P(w_s|q_s)$ in the source natural language using an expectation maximization (EM) algorithm with the starting query in the target natural language as the starting translation model; and
   performing a second information retrieval operation on the corpus of documents in the target natural language by inputting the updated query in the target natural language to the monolingual information retrieval system in order to retrieve an updated set of documents in the target natural language;
   wherein the method of performing cross-lingual information retrieval is performed by a computer.

2. The method as set forth in claim 1, further comprising:
   outputting the updated set of documents in the target natural language in a user-perceptible output format.

3. The method as set forth in claim 1, further comprising:
   translating the updated set of documents in the target natural language into the source natural language; and
   outputting the translated updated set of documents in a user-perceptible output format.

4. A cross-lingual information retrieval system comprising:
   a monolingual information retrieval system configured to retrieve documents from a corpus of documents in a target natural language based on a received query in the target natural language; and
   a processor configured to add cross-lingual information retrieval capability to the monolingual information retrieval system, the processor performing a process including:
      representing a starting query in a source natural language by a starting query language model in the source natural language having zero values for words not in the starting query,
      translating the starting query in the source natural language into the target natural language and inputting the translated starting query to the monolingual information retrieval system to retrieve a set of pseudo-feedback documents in the target natural language,
      generating a source language-to-target language translation model based on the set of pseudo-feedback documents in the target natural language and the starting query language model, and
      re-translating the starting query from the source natural language into the target natural language using the translation model and inputting the re-translated starting query to the monolingual information retrieval system to retrieve an updated set of documents in the target natural language;
   wherein the translation model is generated by maximizing a likelihood of the set of pseudo-feedback documents in the target natural language given the starting query language model in the source natural language using an expectation maximization (EM) algorithm with the translated starting query as the starting translation model.

5. The cross-lingual information retrieval system as set forth in claim 4, wherein the processor configured to add cross-lingual information retrieval capability to the monolingual information retrieval system is also configured to embody the monolingual information retrieval system.

6. The cross-lingual information retrieval system as set forth in claim 4, further comprising:
   an output device configured to represent the updated set of documents in a human-perceptible representation.

7. The cross-lingual information retrieval system as set forth in claim 4, further comprising:

a machine translation engine configured to translate the updated set of documents from the target natural language to the source natural language; and an output device configured to represent the machine-translated updated set of documents in a human-perceptible representation.

8. A non-transitory storage medium storing instructions executable to perform a cross-lingual information retrieval method comprising:

translating a query $q_s=\{w_{s1}, \ldots, w_{sl}\}$ in a source natural language represented as a starting query language model $P(w_s|q_s)$ in the source natural language into a target natural language different from the source natural language to generate a starting query in the target natural language;

performing a first information retrieval operation on a corpus of documents in the target natural language by inputting the starting query in the target natural language to a monolingual information retrieval system configured to operate in the target natural language in order to retrieve a set of pseudo-feedback documents in the target natural language;

generating an updated query in the target natural language represented as an updated query language model $p(w_t|q_s)$ in the target natural language computed as:

$$p(w_t | q_s) = \sum_{w_s} \theta_{st}^{adapted} P(w_s | q_s)$$

where $\theta_{st}^{adapted}$ represents a translation model generated by maximizing a likelihood of the set of pseudo-feedback documents in the target natural language given the starting query language model $P(w_s|q_s)$ in the source natural language using an expectation maximization (EM) algorithm with the starting query in the target natural language as the starting translation model wherein the updated query in the target natural language does not include any source word-to-translation word pairs that are not included in the starting translation model; and performing a second information retrieval operation on the corpus of documents in the target natural language by inputting the updated query in the target natural language to the monolingual information retrieval system in order to retrieve an updated set of documents in the target natural language.

9. The non-transitory storage medium as set forth in claim 8 wherein $P(w_s|q_s)=0$ for words $w_s$ that are not in the query $q_s=\{w_{s1} \ldots, w_{sl}\}$.

* * * * *